(12) United States Patent
Drewes

(10) Patent No.: US 9,162,547 B2
(45) Date of Patent: Oct. 20, 2015

(54) METHOD FOR CONFIGURING AN ELECTRONIC CONTROL UNIT OF A MOTOR VEHICLE TRAILER

(75) Inventor: Olaf Drewes, Aschaffenburg (DE)

(73) Assignee: SAF-HOLLAND, GmbH, Bessenbach (DE)

( * ) Notice: Subject to any disclaimer, the term of this patent is extended or adjusted under 35 U.S.C. 154(b) by 0 days.

(21) Appl. No.: 13/822,354

(22) PCT Filed: Sep. 15, 2011

(86) PCT No.: PCT/EP2011/066035
§ 371 (c)(1),
(2), (4) Date: Mar. 12, 2013

(87) PCT Pub. No.: WO2012/035114
PCT Pub. Date: Mar. 22, 2012

(65) Prior Publication Data
US 2013/0218411 A1    Aug. 22, 2013

(30) Foreign Application Priority Data

Sep. 17, 2010    (DE) .......................... 10 2010 040 977

(51) Int. Cl.
G06F 7/00 (2006.01)
B60G 17/015 (2006.01)
B60T 8/17 (2006.01)
B60T 13/68 (2006.01)
G07C 5/08 (2006.01)

(52) U.S. Cl.
CPC ............. B60G 17/015 (2013.01); B60T 8/1708 (2013.01); B60T 13/683 (2013.01); B60T 2260/06 (2013.01); G07C 5/085 (2013.01)

(58) Field of Classification Search
CPC ... B60T 13/683; B60T 8/1708; B60T 8/1887; B60T 8/323
USPC .......................................................... 701/36
See application file for complete search history.

(56) References Cited

U.S. PATENT DOCUMENTS 8,135,527 B2 * 3/2012 Barlsen et al. .................. 701/70
2001/0054841 A1 * 12/2001 Ross et al. ....................... 303/20

FOREIGN PATENT DOCUMENTS

| DE | 102006039764 A1 | 2/2008 |
| DE | 60113192 T3 | 4/2012 |
| EP | 2042379 A2 | 4/2009 |
| GB | 2363435 A | 12/2001 |

OTHER PUBLICATIONS

International Search Report, PCT/EP2011/066035, Feb. 13, 2012, 4 pages.

* cited by examiner

*Primary Examiner* — Maceeh Anwari
(74) *Attorney, Agent, or Firm* — Price Heneveld LLP

(57) ABSTRACT

The invention relates to a method of configuring an electronic control unit (140) of a motor vehicle trailer using specific data for the chassis systems and/or chassis components which are installed on the motor vehicle trailer. It is provided that a chassis system (131) and/or at least one chassis component are/is equipped with at least one machine-readable data carrier (160) in which data which can be used for configuring the control unit (140) is stored, wherein, in order to configure the control unit (140), this data carrier (160) is read out and the data stored therein is transferred to the control unit (140). The invention also relates to a chassis system, a chassis component and a motor vehicle trailer.

12 Claims, 1 Drawing Sheet

METHOD FOR CONFIGURING AN ELECTRONIC CONTROL UNIT OF A MOTOR VEHICLE TRAILER

FIELD OF THE INVENTION

The invention relates to a method of configuring an electronic control unit of a motor vehicle trailer using specific data for the chassis systems and/or chassis components which are installed or to be installed on the motor vehicle trailer. The invention further relates to a chassis system, a chassis component, and a motor vehicle trailer.

BACKGROUND OF THE INVENTION

From DE 10 2007 053 766 B3 there is known a control arrangement for a motor vehicle trailer having a service brake, a parking brake, and an air suspension system. The control arrangement includes inter alia an electronic control unit (EBS (electronic braking system) control unit) which controls the service brake.

If, on a motor vehicle trailer, there is installed or exchanged a chassis system or a chassis component, a control unit present on the motor vehicle trailer has to be configured using specific data for the chassis system and/or for the chassis components in addition to configuring means adjusting and/or adapting the control unit. Nowadays, the required data is usually entered manually into the control unit by the vehicle manufacturer or the workshop. Furthermore, it is known that the vendors of chassis systems and/or chassis components provide pre-configured control units, wherein it is necessary to purposefully correlate the control unit and the chassis system or chassis component which requires much effort and is prone to errors.

One object underlying the invention is to show a possibility of facilitating the configuration of an electronic control unit of a motor vehicle trailer.

BRIEF SUMMARY OF THE INVENTION

The method according to the invention of configuring an electronic control unit of a motor vehicle trailer using specific data for the chassis systems and/or chassis components which are (or are to be) installed on the motor vehicle trailer is characterized in that at least one chassis system and/or at least one chassis component is/are equipped with at least one machine-readable data carrier on or in which data which can be used at least for configuring the control unit is stored. In order to configure the control unit, the data carrier is read out and the data stored thereon is transmitted or transferred to the control unit. The data transmitted to the control unit is used in the control unit for the configuration thereof. To do so, it might be necessary to transform the format of the data.

Preferably, there is provided that on the data carrier there is stored all data relating to the chassis system or the chassis component, which data is required for configuring the control unit accordingly. Furthermore, it is possible to store on the data carrier additional data and/or information relating to the specific chassis (e.g. data relating to the specific axle and brake systems such as spring characteristics and stiffness values), which data/information can be read out and transmitted to the control unit and then be used purposefully for important trailer functions and/or the functions of the tractor-trailer unit as a whole.

Motor vehicle trailer means a vehicle which, as a rule, does not have a full-scale drive mechanism of its own and is drawn or pulled by a tractor. A motor vehicle trailer in the sense of the invention is in particular a truck trailer, which also includes semi-trailers and special trailers (such as trailers used mainly in agriculture). The chassis of a motor vehicle trailer serves for connecting the motor vehicle trailer and the road. The chassis includes, inter alia, the wheels, the wheel suspension systems (in particular the axles), the shock absorbers, the steering mechanism as well as the service brake and the parking brake. The chassis may further include additional axles, trailing axles, lifting axles and/or steering axles as well as the components required for the operation thereof. This is no conclusive enumeration. A chassis system in the sense of the invention means the combination of several individual components to form an assembly which is in particular ready-to-mount.

An electronic control unit (hereinafter merely referred to as control unit) in the sense of the invention means a module which surveils the operational states of the motor vehicle trailer (monitoring) and/or controls essential functions of the motor vehicle trailer. Such a control unit is in particular an EBS control unit whose surveillance and/or controlling functions, however, do not have to be limited to the electronic braking system. In particular, there is provided that the control unit of the motor vehicle trailer communicates with a control unit of the tractor vehicle, whereby important functions of the tractor-trailer unit as a whole (e.g. an optimized control of the vehicle dynamics or a limitation of the speed) are made possible.

Data in the sense of the invention means transmittable information units which may be used for configuring a control unit. Such data may be characteristic curves or characteristic diagrams, characteristic numbers, parameters, values or the like, for example. The data may be merged or combined to form data sets.

A machine-readable data carrier (hereinafter merely referred to as data carrier) means a carrier of information which in particular contains a large number of data which may be read out by a machine (i.e. not manually). Such a data carrier is in particular a magnetic strip, a bar-code label, a DataMatrix code label, a QR label, a holographic memory or an RHO transponder or the like.

The method according to the invention makes it possible for the vehicle manufacturer or the workshop, in a simple and error-free manner, to collect the specific data, which is stored on the data carrier and relates to a chassis system which has been installed or is to be installed, or a chassis component, which has been installed or is to be installed, and to transmit said data to the control unit in order to configure the control unit accordingly and, in particular, to parameterize it, (Parameterizing means attributing concrete values to parameters, place holders and the like). Thus, the configuration is substantially facilitated when compared to configuration methods known in the state of the art. Furthermore, configuration errors are avoided.

While, in the configuration methods known in the state of the art, only a limited scope of the data potentially available for a chassis system or a chassis component is used for configuring the control unit, so as to keep the configuration efforts justifiable, the method according to the invention makes it possible to use a substantially larger amount of data for the configuration. Thus, it is possible to open up unused potentials for an optimal control of the motor vehicle trailer and/or the tractor-trailer unit as a whole.

Furthermore, it is possible to achieve that the approval conformity of the motor vehicle trailer is maintained and/or important specifications of the vendor of the respective chassis system or of the respective chassis component are not undermined when configuring and, in particular, parameterizing the control unit, whereby it is possible to exclude e.g. manipulation and/or configuration errors.

Besides, the method according to the invention is not limited to the configuration of control units for motor vehicle trailers. It is also possible to use the method according to the invention when configuring any type of vehicle control unit, such as in particular truck control units or bus control units.

Preferably, there is provided that the data carrier is manually read out, to which end there is in particular provided a respective hardware. For example, the vehicle manufacturer or the workshop may read out the data carrier using a handheld scanner or reading device and transmit the data obtained in this way to a the control unit via a data connection which is to be established.

Preferably, there is also provided that the data carrier is automatically read out. It may be provided, for example, that the data carrier is designed as an RFID transponder and that the control unit is coupled with a respective reading device. The communication connection may be made automatically or manually.

Preferably, on the data carrier, there is further stored information on the scope of equipment of the respective chassis system or of the respective chassis component (e.g., with/without wear sensing or detection, with/without tire pressure control, etc.), which information is also transmitted to the control unit and made part of the surveillance functions (monitoring functions) there, which is in particular done automatically. Information means indications exceeding mere data.

Furthermore, there may be provided that on the data carrier there is/are also stored operation or handling information, maintenance information and/or service information on the respective chassis system or on the respective chassis component, which information is also transmitted to the control unit. Thus, it becomes possible to carry out a trailer-specific diagnosis, for example, and to purposefully give handling recommendations and/or to generate maintenance and service procedures. Likewise, there may be provided that also (in particular approval-relevant) inspection sheet data of the respective chassis system or of the respective chassis component is stored on the data carrier, which data is also transmitted to the control unit.

According to a particularly preferred further development, there is provided a retransmission from the control unit to the data carrier of a chassis system or of a chassis component in order to purposefully store information and/or data from the control unit on the data carrier. This is advantageous e.g. when, in the case of a customer complaint, the chassis system or the chassis component is to be returned to the vendor (manufacturer) for error diagnosis.

The chassis system according to the invention and the chassis component according to the invention are characterized in that they comprise at least one machine-readable data carrier on which there is stored data usable for the configuration of a control unit of the motor vehicle trailer.

Expediently, the data carrier is designed such that it can be read out for configuring the control unit and that data and/or information retransmitted by the control unit can be stored on the data carrier. Preferably, to this end the data carrier comprises means which can be read out (such as IC chips), from which data may be read out. The data may be configuration data for the control unit. The data retransmitted by the control unit may be stored in a volatile or non-volatile memory (such as ROM or RAM, . . . ) of the data carrier.

The motor vehicle trailer of the invention is characterized in that it comprises at least one chassis system according to the invention and/or at least one chassis component according to the invention.

In particular, there is provided that it comprises also at least one control unit which can be configured according to the method according to the invention. Preferably, the control unit is designed with a respective interface.

The invention will be described hereinafter in more detail by way of example making reference to the Figures.

DETAILED DESCRIPTION

Figure 1:
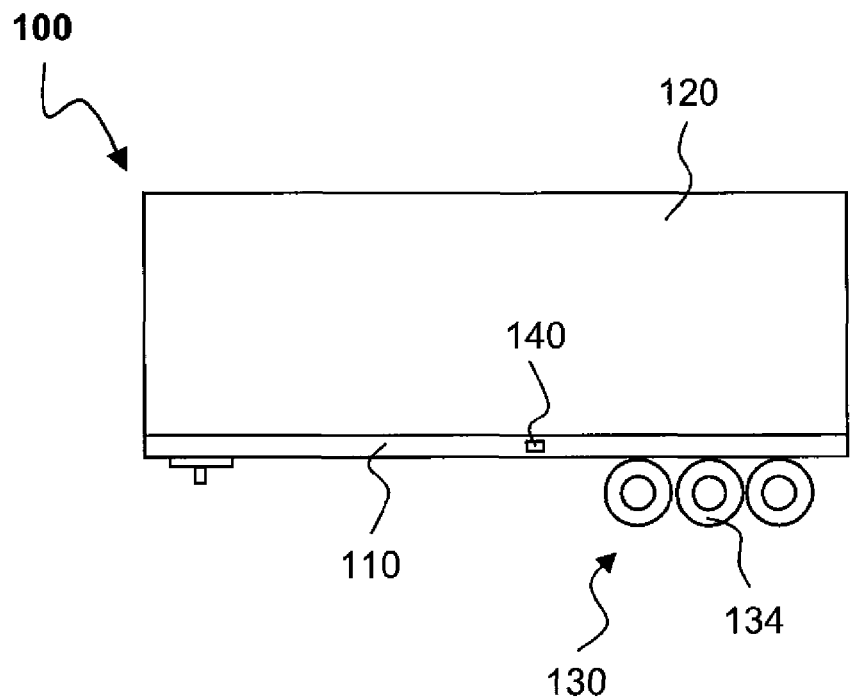
FIG. 1 shows a side view of a motor vehicle trailer according to the invention.
Figure 2:
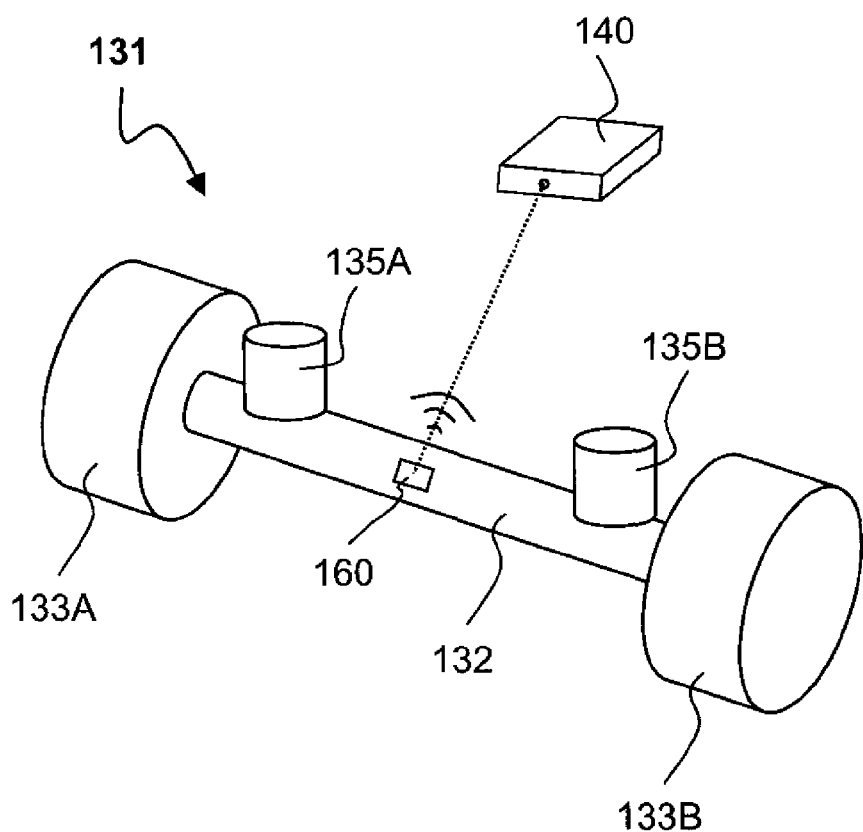
FIG. 2 shows a perspective view of a chassis system of the motor vehicle trailer of FIG. 1.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 shows a motor vehicle trailer 100, wherein a truck semi-trailer is shown by way of example. The motor vehicle trailer 100 includes a structure 120 carried by a frame 110 as well as a chassis 130 connected to the frame 110. The chassis 130 includes, inter alia, the wheels 134, the wheel suspension systems (axles), the shock absorbers, the service brake and the parking brake.

140 designates a control unit (ECU) of the motor vehicle trailer 100 attached to the frame 110, which control unit monitors the operational states of the motor vehicle trailer 100 and/or controls essential functions of the motor vehicle trailer 100, and in particular of the chassis 130. Such a control unit is an EBS control unit, for example.

When mounting or replacing chassis systems and/or chassis components, the control device 140 has to be configured using respective data, i.e. data relating to the chassis system installed (or to be installed) or to the chassis component installed (or to be installed), which will be explained hereinafter with reference to FIG. 2.

FIG. 2 shows a chassis system which, as a whole, is designated by reference numeral 131 and which includes an axle 132 having drum brakes 1331 and 1338 attached thereto (for the service brake) as well as two pneumatic spring units 1351 and 1358. As a matter of course, also other types of brake such as disc brakes may be provided. According to the invention there is provided that on the assembly 131 there is arranged at least one data carrier 160 on which the data relevant at least for the operation of the chassis system 131 is stored and which may be required for configuring the control unit 140. Furthermore, on the data carrier 160, there may be stored additional data and/or information, as has been explained above.

By way of example, the data carrier 160 is directly arranged on or glued to the axle 132. The data carrier 160 may be provided with a protection against damage. Likewise, there may be provided that the data carrier 160 is integrated into the axle 132 such that it is not visible from the outside.

In order to configure the control unit 140 of the motor vehicle trailer 100, the data carrier 160 is read out and the data contained is transmitted to the control unit 140 for configuration, to which end the control unit 140 is provided with a respective interface. In the example shown, the data carrier 160 is designed as an RFID transponder, and the control unit 140 is designed with an integrated reading device. The reading out of the data carrier 160 and the transmission of the read-out data to the control unit 140 thus can be carried out largely automatically and cable-less. Alternatively, it is also possible to read out a data carrier 160 with the help of a scanner or the like, for example, as has been explained above. Such a scanner is in particular a hand-held scanner which is connected to a computer, for example, which is provided with respective programs.

Using the method proposed, it is possible to configure the control unit 140 independently from, possible control connections with the chassis system 131 or individual chassis components. Furthermore, it is possible to configure the control unit 140 with data from chassis systems and/or chassis components which are not connected to the control unit 140.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A method of configuring an electronic control unit of a motor vehicle trailer using a first data stored on at least one non-transitory data carrier, wherein the first data is related a chassis system and a chassis component, wherein the chassis system and the chassis component is installed on the motor vehicle trailer, and wherein the electronic control unit communicates with a control unit of a tractor vehicle, the method comprising the steps of:
    reading out the at least one non-transitory data carrier which is mounted on or within an axle of the chassis system and wherein the non-transitory data carrier includes at least one IC chip;
    transmitting the first data from the at least one non-transitory data carrier to the electronic control unit;
    transmitting a second data from the electronic control unit to the at least one non-transitory data carrier; and
    storing the second data onto the at least one non-transitory data carrier.

2. The method of claim 1, wherein the non-transitory data carrier is read out manually.

3. The method of claim 1, wherein the non-transitory data carrier is read out automatically.

4. The method of claim 1, wherein the first data comprises data related to the scope of equipment of the chassis system and the chassis component.

5. The method of claim 1, wherein the first data comprises data related to the operation of the chassis system and the chassis component.

6. The method of claim 1, wherein the first data comprises data related to the maintenance of the chassis system and the chassis component.

7. The method of claim 1, wherein the first data comprises data related to the service of the chassis system and the chassis component.

8. The method of claim 1, wherein the first data comprises data related to an inspection sheet associated with the chassis system and the chassis component.

9. The motor vehicle trailer of claim 1, wherein the data carrier is selected from the group comprising:
    a magnetic strip, a bar-code label, a Data Matrix code label, a QR Code label, a holographic memory and an RFID transponder.

10. A motor vehicle trailer, comprising:
    at least one of a chassis system and a chassis component;
    at least one non-transitory data carrier that stores a first data, and reads out the stored first data to configure at least one control unit of the motor vehicle trailer and to receive and store a second data from the at least one control unit, wherein the at least one control unit communicates with a control unit of a tractor vehicle;
    the non-transitory data carrier being mounted on or within an axle of the chassis system; and
    the data carrier includes at least one IC chip.

11. The motor vehicle trailer of claim 10, wherein the data carrier is selected from the group comprising:
    a magnetic strip, a bar-code label, a Data Matrix code label, a QR Code label, a holographic memory and an RFID transponder.

12. The motor vehicle trailer of claim 10, further comprising one of a truck trailer and semi-trailer.

\* \* \* \* \*

UNITED STATES PATENT AND TRADEMARK OFFICE
CERTIFICATE OF CORRECTION

PATENT NO. : 9,162,547 B2
APPLICATION NO. : 13/822354
DATED : October 20, 2015
INVENTOR(S) : Olaf Drewes It is certified that error appears in the above-identified patent and that said Letters Patent is hereby corrected as shown below:

In the Specification

*Col. 2, line 40
"RHO" should be – RFID –

*Col. 2, line 50
"like)." should be – like.) –

*Col. 3, line 13
Delete "a" ($1^{st}$ occurrence)

*Col. 4, line 49
"EBS" should be – ESB –

*Col. 4, line 58
"1331 and 1338" should be – 133A and 133B –

*Col. 4, lines 59 and 60
"1351 and 1358" should be – 135A and 135B –

In the Claims

*Col. 5, claim 1, line 36
After "related" insert -- to --

*Col. 5, claim 1, line 38
"is" should be – are –

Signed and Sealed this
Eighth Day of March, 2016

Michelle K. Lee
*Director of the United States Patent and Trademark Office*